US012811831B2

(12) United States Patent
Graumann et al.

(10) Patent No.: US 12,811,831 B2
(45) Date of Patent: Nov. 24, 2026

(54) FEEDFORWARD PHASE CORRECTION

(71) Applicant: Microchip Technology Incorporated, Chandler, AZ (US)

(72) Inventors: Peter Graumann, Calgary (CA); Fan Yang, Burnaby (CA)

(73) Assignee: Microchip Technology Incorporated, Chandler, AZ (US)

( * ) Notice: Subject to any disclaimer, the term of this patent is extended or adjusted under 35 U.S.C. 154(b) by 17 days.

(21) Appl. No.: 18/983,594

(22) Filed: Dec. 17, 2024

(65) Prior Publication Data

US 2026/0100867 A1 Apr. 9, 2026

Related U.S. Application Data

(60) Provisional application No. 63/702,849, filed on Oct. 3, 2024.

(51) Int. Cl.
*H04L 25/03* (2006.01)
*H04L 25/49* (2006.01)

(52) U.S. Cl.
CPC .... *H04L 25/03057* (2013.01); *H04L 25/4917* (2013.01)

(58) Field of Classification Search
CPC ...................... H04L 25/03057; H04L 25/4917
USPC ........................................................ 375/233
See application file for complete search history.

(56) References Cited

U.S. PATENT DOCUMENTS 9,780,881 B1 * 10/2017 Rope .................. H04B 10/0795
12,413,457 B1 * 9/2025 Yang ................. H04L 25/03267
2004/0234002 A1 * 11/2004 Yang ......................... H04L 5/12 375/263
2009/0161747 A1 * 6/2009 Aziz ................. H04L 25/03057 375/233
2018/0278405 A1 * 9/2018 Yao ....................... H04L 7/0334
2022/0231889 A1 7/2022 Zhang et al.
(Continued)

FOREIGN PATENT DOCUMENTS

GB 2165110 A 4/1986

OTHER PUBLICATIONS

International Search Report & Written Opinion issued on Jul. 3, 2025, in corresponding International Application No. PCT/US2025/013961(16 pages).

*Primary Examiner* — Kevin M Burd
(74) *Attorney, Agent, or Firm* — Shumaker, Loop & Kendrick, LLP; Ryan M. Corbett; Andrew P. Stevens

(57) ABSTRACT

A pulse amplitude modulation 4-level (PAM-4) physical layer (PHY) serializer/deserializer (SerDes) receiver is provided. The receiver may include an analog-front-end (AFE) block to receive a transmit signal, an analog-to-digital converter (ADC) block to convert the transmit signal into a digital signal at sampling intervals defined by a sampling clock signal, a clock and data recovery (CDR) circuit to receive the digital signal from the ADC block and extract a recovered clock signal and a recovered data stream, the recovered data stream containing a sequence of symbols with amplitude values corresponding to four levels of PAM-4, a phase integrator (PI) to generate the sampling clock signal for the ADC block based on the recovered clock signal, and a feedforward phase correction (FFPC) block to receive the recovered data stream and generate a receive signal.

20 Claims, 4 Drawing Sheets

(56) References Cited

U.S. PATENT DOCUMENTS

2025/0202739 A1 * 6/2025 Ramasubramanian ...................... H04L 25/03267

* cited by examiner

FEEDFORWARD PHASE CORRECTION

CROSS-REFERENCE TO RELATED APPLICATION

The present application claims priority to U.S. Provisional Patent Application No. 63/702,849, entitled: Feedforward Phase Correction, filed on Oct. 3, 2024, the contents of which are hereby incorporated by reference in their entirety.

TECHNICAL FIELD

The present disclosure relates generally to digital signal processing, and more specifically to digital signal processing by a pulse amplitude modulation 4-level (PAM-4) physical layer (PHY) serializer/deserializer (SerDes) receiver.

SUMMARY

According to an aspect of one or more examples, there is provided a pulse amplitude modulation 4-level (PAM-4) physical layer (PHY) serializer/deserializer (SerDes) receiver. The receiver may include an analog-front-end (AFE) block to receive a transmit signal, an analog-to-digital converter (ADC) block to convert the transmit signal into a digital signal at sampling intervals defined by a sampling clock signal, a clock and data recovery (CDR) circuit to receive the digital signal from the ADC block and extract a recovered clock signal and a recovered data stream, the recovered data stream containing a sequence of symbols with amplitude values corresponding to four levels of PAM-4, a phase integrator (PI) to generate the sampling clock signal for the ADC block based on the recovered clock signal, and a feedforward phase correction (FFPC) block to receive the recovered data stream and generate a receive signal. The FFPC block may include a feed-forward equalization/decision feedback equalization (FFE/DFE) block to equalize the recovered data stream across different receiver paths including a leading path, a nominal path, and a lagging path, a slicer error computation block to compute one or more slicer errors for the symbols of the sequence of symbols, and a receiver path selection block to compute a total slicer error for each receiver path and select the receiver path with the lowest total slicer error. The FFE/DFE block may include a 37-tap FFE to receive the recovered data stream and perform feed-forward equalization on the recovered data stream, a plurality of 3-tap FFEs to receive the recovered data stream and perform feed-forward equalization, the plurality of 3-tap FFEs respectively corresponding to the different receiver paths, a plurality of adders to combine an output signal of the 37-tap FFE with a respective output signal of one of the plurality of 3-tap FFEs to generate combined equalized signals for the respective receiver paths, a plurality of one-tap DFEs respectively corresponding to the different receiver paths, the plurality of one-tap DFEs to receive the combined equalized signals from the plurality of adders and apply decision feedback equalization, and a multiplexer to receive output signals from the plurality of one-tap DFEs and select one of the outputs for delivery to the slicer error computation block. A slicer error for a symbol may be computed by measuring a distance between the amplitude value of the symbol and a nearest expected PAM-4 level. The nearest expected PAM-4 level may be determined based on whether the amplitude value of the symbol is above or below a symbol threshold line, the symbol threshold line being equidistant between two adjacent expected PAM-4 levels. The slicer error for the symbol may be an absolute value of the distance, a square of the distance, or the absolute value of the distance raised to a power. The slicer error for the symbol may be greatest when the amplitude value of the symbol is on a symbol threshold line, and lowest when the amplitude value of the symbol is on an expected PAM-4 level. The receiver path selection block may include a lookup table to store the slicer error for a symbol at an index corresponding to a unit interval of the symbol. The recovered data stream may be sampled over at least 64 unit intervals. A first symbol error rate (FSER) of the receiver may be less than or equal to peripheral component interconnect express (PCIe) Gen7 specification standard 1e-6. The CDR may implement a Mueller-Muller (MM) technique or a Bang-Bang (BB) technique. The nominal path may be based on a clock of the receiver aligning with timing of the transmit signal, the leading path may be based on the transmit signal arriving earlier than expected and processes the recovered data stream with an earlier phase shift, and the lagging path may be based on the transmit signal arriving later than expected and processes the recovered data stream with a delayed phase shift. The receiver path selection block may include a plurality of adders to sum slicer errors from the slicer error computation block to determine total slicer errors for the different receiver paths, a comparator to determine a lowest total slicer error of the different receiver paths, and a multiplexer to identify the receiver path that corresponds to the lowest total slicer error, and output a PAM-4 symbol that corresponds to the identified receiver path.

According to an aspect of one or more examples, there is provided a feedforward phase correction (FFPC) block of a pulse amplitude modulation 4-level (PAM-4) physical layer (PHY) serializer/deserializer (SerDes) receiver for signal processing. The FFPC block may include a feed-forward equalization/decision feedback equalization (FFE/DFE) block to equalize a recovered data stream containing a sequence of symbols across different receiver paths including a leading path, a nominal path, and a lagging path; a slicer error computation block to compute one or more slicer errors for the symbols of the recovered data stream; and a receiver path selection block to compute a total slicer error for each receiver path and select a receiver path with a lowest total slicer error. A slicer error for a symbol may be computed by measuring a distance between an amplitude value of the symbol and a nearest expected PAM-4 level. The nearest expected PAM-4 level may be determined based on whether the amplitude value of the symbol is above or below a symbol threshold line, the symbol threshold line being equidistant between two adjacent expected PAM-4 levels. The slicer error for the symbol may be an absolute value of the distance, a square of the distance, or the square of the absolute value of the distance. The slicer error for the symbol may be greatest when the amplitude value of the symbol is on a symbol threshold line, and lowest when the amplitude value of the symbol is on an expected PAM-4 level. The nominal path may be based on a clock of the receiver aligning with timing of a transmit signal, the leading path may be based on the transmit signal arriving earlier than expected and processes the recovered data stream with an earlier phase shift, and the lagging path may be based on the transmit signal arriving later than expected and processes the recovered data stream with a delayed phase shift.

According to an aspect of one or more examples, there is provided a method for signal processing in a feedforward phase correction (FFPC) block of a pulse amplitude modulation 4-level (PAM-4) physical layer (PHY) serializer/ deserializer (SerDes) receiver. The method may include equalizing a recovered data stream containing a sequence of symbols across different receiver paths, including a leading path, a nominal path, and a lagging path, using a feed-forward equalization/decision feedback equalization (FFE/DFE) process, computing one or more slicer errors for the symbols of the recovered data stream, computing a total slicer error for each receiver path by aggregating slicer errors corresponding to the respective receiver path, and selecting a receiver path with the lowest total slicer error.

DETAILED DESCRIPTION OF VARIOUS EXAMPLES

Figure 1:
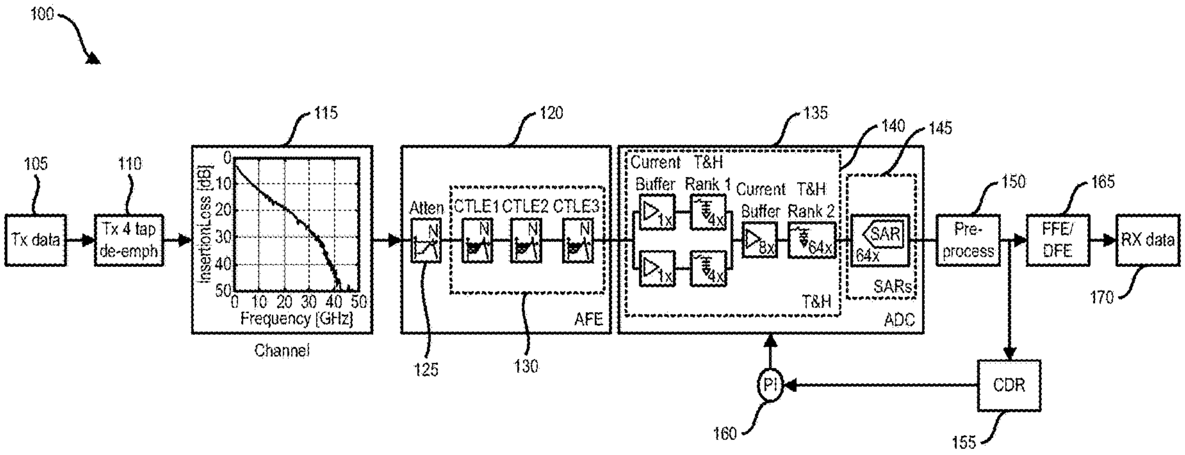
(Prior Art) FIG. 1
FIG. 1 shows a high-level block diagram of a pulse amplitude modulation 4-level (PAM-4) physical layer (PHY) serializer/deserializer (SerDes) receiver according to the prior art.

Reference will now be made in detail to the following various examples, which are illustrated in the accompanying drawings, wherein like reference numerals refer to like elements throughout. The following examples may be embodied in various forms without being limited to the examples set forth herein.

The demand for higher data rates in modern computing and communication systems has led to the development of interfaces such as PCIe Gen7, which operates at a speed of 128 gigabits per second (Gbps) using Pulse Amplitude Modulation 4-level (PAM-4) signaling. This technology transmits data at 64 gigabaud (Gbaud), effectively sending 2 bits (e.g., 00, 01, 10, or 11) per symbol. However, achieving reliable data transmission at these high-speeds may be challenging due to factors such as channel insertion loss, cross-talk noise, and complex receiver designs that function under varying Process, Voltage, and Temperature (PVT) conditions. These challenges make it increasingly difficult to meet the PCIe Gen7 specification, which specifies a First Symbol Error Rate (FSER) of 1e-6, which equates to one initial PAM-4 symbol error for every one million input symbols.

High-speed receiver systems may use a Clock and Data Recovery (CDR) loop, which determines optimal sampling points for the incoming data stream. However, CDR in high-speed SerDes systems may not maintain accurate phase tracking due to inherent noise and challenges in tracking complex patterns such as SRIS (Separate Reference with Independent Spread) and JTOL (Jitter Tolerance). These tracking errors contribute to additional FSER events, which can impact multiple PAM-4 symbols (e.g., up to 64 symbols in the case of PCIe Gen7, corresponding to 64 unit intervals (UI) at 1 GHz).

The Mueller-Muller (MM) CDR technique may be used to reduce the operational demands on the CDR. But, the MM CDR technique may struggle to maintain phase tracking during SRIS operations, as improved bandwidth can enhance tracking but simultaneously increase phase noise.

Given the importance of latency in PCIe operations, standard Maximum Likelihood Sequence Estimations (MLSE) techniques may not be feasible. Simulation data indicate that error events are most likely to occur when the receiver timing point deviates furthest from a specified location. Furthermore, studies of CDR freeze conditions reveal that freezing the CDR phase at the specified location provides insights into performance. Accordingly, there exists a need for improved processing techniques in high-speed PAM4 SerDes receivers to effectively reduce FSER, improve channel compliance, and ensure reliable data transmission under challenging conditions.

FIG. 1 shows a high-level block diagram of a pulse amplitude modulation 4-level (PAM-4) physical layer (PHY) serializer/deserializer (SerDes) receiver 100 according to the prior art. As shown in FIG. 1, the input data, denoted by Tx data 105, is processed at the transmitter (Tx) side using a 4-tap de-emphasis filter 110 to pre-compensate for channel losses and mitigate inter-symbol interference (ISI) caused by the transmission medium. De-emphasis may involve boosting high-frequency components of the signal. The 4-tap de-emphasis filter 110 may apply a tap filter that shapes the signal. The 4-tap de-emphasis filter 110 may enhance the desired characteristics of the signal as it prepares to traverse the channel. A central plot 115 illustrates the insertion loss of the communication channel as a function of frequency, showing the degradation of signal strength over higher frequencies. This may represent the transmission line or medium. The channel may include mediums such as copper traces, PCBs, or optical fibers. During this transmission, the signal may experience degradation due to factors like insertion loss and cross-talk. As shown in FIG. 1, insertion loss (y-axis measured in dB) increases as frequency (x-axis measured in GHz) increases. The increase in insertion loss with frequency in GHz ranges can be attributed to, for example, skin effect, dielectric loss, increased interference, connector losses, reflector losses, and material properties.

The receiver 100 may also include an analog-front-end (AFE) 120. The AFE 120 may include one or more filters to remove unwanted noise and reduce interference from other signals, enhancing the quality of the signal before digitization. The AFE 120 may clean up the signal for more accurate processing. As shown in FIG. 1, the one or more filters of the AFE 120 may include, for example, attenuation (Atten) 125 and continuous-time linear equalizers (CTLE) 130. These filters may affect signal conditioning and enhancement. Attenuation 125 may be used for controlling signal amplitude or adjusting signal strength. CTLE 130 may include three stages (e.g., CTLE1, CTLE2, and CTLE3), which may help in equalizing the high-frequency components of the signal.

The receiver 100 may also include an analog-to-digital converter (ADC) block 135. The ADC block 135 may convert the analog signal into a digital format, producing discrete data points that can be processed by digital circuitry. As shown in FIG. 1, the ADC block 135 may include a track and hold (T&H) circuit 140 and a successive approximation register (SAR) 145. The T&H circuit 140 may help the ADC block 135 process a stable input signal during the conversion phase. The SAR 145 may convert the stable signal into a digital format through a binary search method.

The receiver 100 may also include a pre-processing block 150 for further analysis. For example, the pre-processing block 150 may perform tasks like signal conditioning, noise reduction, and initial error correction.

The receiver 100 may also include a clock and data recovery (CDR) circuit 155. The CDR circuit 155 may synchronize the receiver 100 with the incoming data. The CDR circuit 155 may identify sampling points for the received data, extracting clock information from the data stream itself. The CDR circuit 155 may help in interpreting the PAM-4 symbols.

The receiver 100 may also include a phase interpolator (PI) 160. The PI 160 may adjust and stabilize the timing of the sampling points. The PI 160 may integrate phase errors over time and help the receiver 100 continuously align with the incoming signal's timing. The PI 160 may help reduce the impact of noise and variations in the signal. The output from the PI 160 may be fed back to the ADC block 135, allowing for real-time adjustments in the sampling process based on the most recent data characteristics. This feedback loop, also referred to as a CDR loop, may improve the digitization process, and more closely align timing with the specified sampling points.

The receiver 100 may also include a feed-forward equalization/decision feedback equalization (FFE/DFE) block 165. The FFE/DFE block 165 may apply a set of filter taps to reduce ISI by predicting future samples based on past samples. The FFE/DFE block 165 may use previously decoded bits to correct current decisions, which provides feedback on the signal. The FFE/DFE block 165 may enhance signal quality and reduce errors.

The FFE/DFE block 165 may deliver the processed signal as receive data, denoted by Rx data 170, ready for further digital processing or use by a receiving system. The Rx data 170 may be cleaner and more reliable than the Tx data 105 after having gone through multiple stages of filtering, correction, and equalization.

Figure 2:
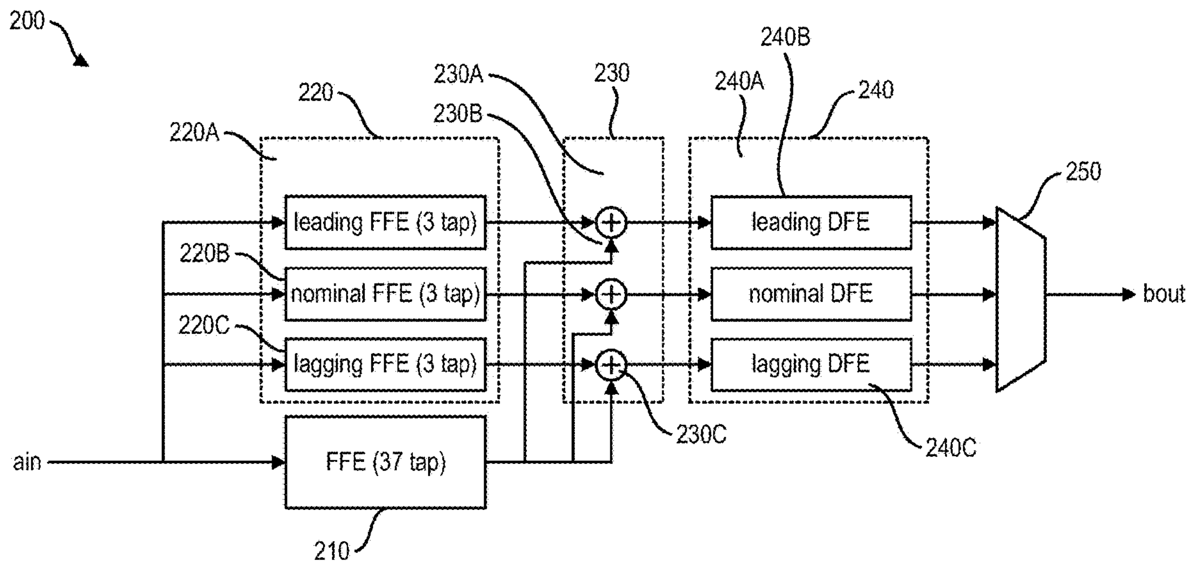
FIG. 2 shows a feed-forward equalization/decision feedback equalization (FFE/DFE) block of a PAM-4 PHY SerDes receiver according to one or more examples.

FIG. 2 shows a feedback equalization (FFE/DFE) block 200 of a PAM-4 PHY SerDes receiver according to one or more examples. According to one or more examples, the FFE/DFE block 200 may be part of a feedforward phase correction (FFPC) block (not shown in FIG. 2) of a PAM-4 PHY SerDes receiver. The FFPC block may include the FFE/DFE block 200, a slicer error computation block (described below in FIG. 3), and a receiver path selection block (described below in FIG. 4). The FFPC block may replace the FFE/DFE block 165 in FIG. 1 to lower the FSER of the PAM-4 PHY SerDes receiver 100 (e.g., FSER is less than or equal to PCIe standard 1e-6 or OTN standard 1e-4). The FFPC block may receive a recovered data stream from the CDR and generate a receive signal. The recovered data stream may include a sequence of symbols with amplitude values corresponding to four levels of PAM-4.

The FFE/DFE block 200 may equalize the recovered data stream across different receiver paths including a leading path, a nominal path, and a lagging path. As shown in FIG. 2, the FFE/DFE block 200 may include a 37-tap FFE 210, a plurality of 3-tap FFEs 220 (e.g., 3-tap leading FFE 220A, 3-tap nominal FFE 220B, and 3-tap lagging FFE 220C), a plurality of adders 230 (e.g., 230A, 230B, and 230C), a plurality of one-tap DFEs 240 (e.g., 3-tap leading DFE 240A, 3-tap nominal DFE 240B, and 3-tap lagging DFE 240C), and a multiplexer (MUX) 250. The number of taps for any of the FFEs or DFEs may vary and is not limited to the specific examples shown.

The plurality of 3-tap FFEs 220 may receive a recovered data stream containing a sequence of symbols with amplitude values corresponding to four levels of PAM-4 from the CDR and perform feed-forward equalization. The plurality of 3-tap FFEs 220 may respectively correspond to different receiver paths. The different receiver paths may include a leading path, a nominal path, and a lagging path. For example, the plurality of 3-tap FFEs 220 may include a 3-tap leading FFE 220A, a 3-tap nominal FFE 220B, and a 3-tap lagging FFE 220C. Taps may represent coefficients applied to input samples of a signal. For example, the plurality of 3-tap FFEs 220 may use three distinct coefficients, or taps, to process the incoming signals. Each tap may correspond to a specific sample from the signal and is multiplied by its associated coefficient. The plurality of 3-tap FFEs 220 may operate in the feedforward path, in that they use the current and previous input samples to produce the output. According to one or more examples, the plurality of 3-tap FFEs 220 may calculate a weighted sum of the current and two preceding input samples. The center three taps may be the sum of the current, one preceding, and one subsequent input sample. For example, a 40-tap filter may have 7-taps before the cursor, one cursor tap, and 32-taps after the cursor. The data to be processed may be presented as 64 ADC values in parallel every clock cycle, each representing one unit interval. These may represent 64 ADC samples in sequence from the transmitter. The 3-tap leading FFE 220A may assume the CDR (e.g., the CDR circuit 155 in FIG. 1) is early by a specified period. For example, the 3-tap leading FFE 220A may assume the CDR is early by two picoseconds. The 3-tap lagging FFE 220C may assume the CDR (e.g., the CDR 155 of FIG. 1) is late by a specified period. For example, the 3-tap lagging FFE 220C may assume the CDR is late by two picoseconds. According to one or more examples, two picoseconds may be approximately equal to 4/32 unit intervals (UI). According to one or more examples, the specified periods of the 3-tap leading and lagging FFEs 220A and 220C may be approximately equal. According to one or more examples, the specified periods of the 3-tap leading and lagging FFEs 220A and 220C are not equal. If there are more than three receiver paths, the additional paths may represent other CDR values. For example, there may be a nominal path, ±1 picosecond leading and lagging paths, and ±2 picosecond leading and lagging paths for a FFPC block implementing five receiver paths. According to one or more examples, the nominal path is based on a clock of the receiver aligning with timing of the transmit signal, the leading path is based on the transmit signal arriving earlier than expected and processes the recovered data stream with an earlier phase shift, and the lagging path is based on the transmit signal arriving later than expected and processes the recovered data stream with a delayed phase shift.

The plurality of adders 230 may combine an output signal of the 37-tap FFE with a respective output signal of one of the plurality of 3-tap FFEs to generate combined equalized signals for the respective receiver paths.

The plurality of one-tap DFEs 240 may respectively correspond to the different receiver paths. The plurality of one-tap DFEs may receive the combined equalized signals from the plurality of adders 230 and apply decision feedback equalization. The one-tap DFEs 240 may be implemented as an addition of the 40-tap FFE output of the previous decided PAM-4 level multiplied by a DFE tap value. For example, the DFE tap value may be between 0.5 and 0.8. The DFE tap value may vary between the leading, nominal, and lagging receiver paths. If the CDR is early, then the DFE tap value may be larger (i.e. more of the prior symbol is present at that sample time) and if the CDR is late, then the DFE tap value may be smaller (i.e. less of the prior symbol is present at that sample time). The plurality of one-tap DFEs 240 may have specified coefficients, each corresponding to a delayed version of the received signal, and scale the received signal by the specified coefficient. According to one or more examples, the one-tap leading DFE 240A may have a coefficient greater than a threshold value and the one-tap lagging DFE 240C may have a coefficient less than the threshold value. For example, the threshold value may be in the range of 0.5 to 0.8. According to one or more examples, the one-tap leading DFE 240A may have a coefficient greater than 0.8 and the one-tap lagging DFE 240C may have a coefficient less than 0.8. For example, the one-tap leading DFE 240A may take an input signal and scale it by a coefficient greater than 0.8, and the one-tap lagging DFE 240C may take another input signal and scale it by a coefficient less than 0.8. The multiplexer (MUX) 250 may receive output signals from the plurality of one-tap DFEs 240 and select one of the outputs for delivery to the slicer error block described in FIG. 3. According to one or more examples, if the CDR is early, then the DFE tap may be larger (i.e. more of the prior symbol is present at that sampling time) and if the CDR is late, then the DFE tap may be smaller (i.e. less of the prior symbol is present at the sampling time).

According to one or more examples, the number of receiver paths (and therefore number of 3-tap FFEs 220, adders 230, and one-tap DFEs 240) may be at least five. For example, five receiver paths may include two 3-tap leading FFEs 220A, one 3-tap nominal FFE 220B, and two 3-tap lagging FFEs 220C. As another example, seven receiver paths 220 may include three 3-tap leading FFEs 220A, one 3-tap nominal FFE 220B, and three 3-tap lagging FFEs 220C.

Figure 3:
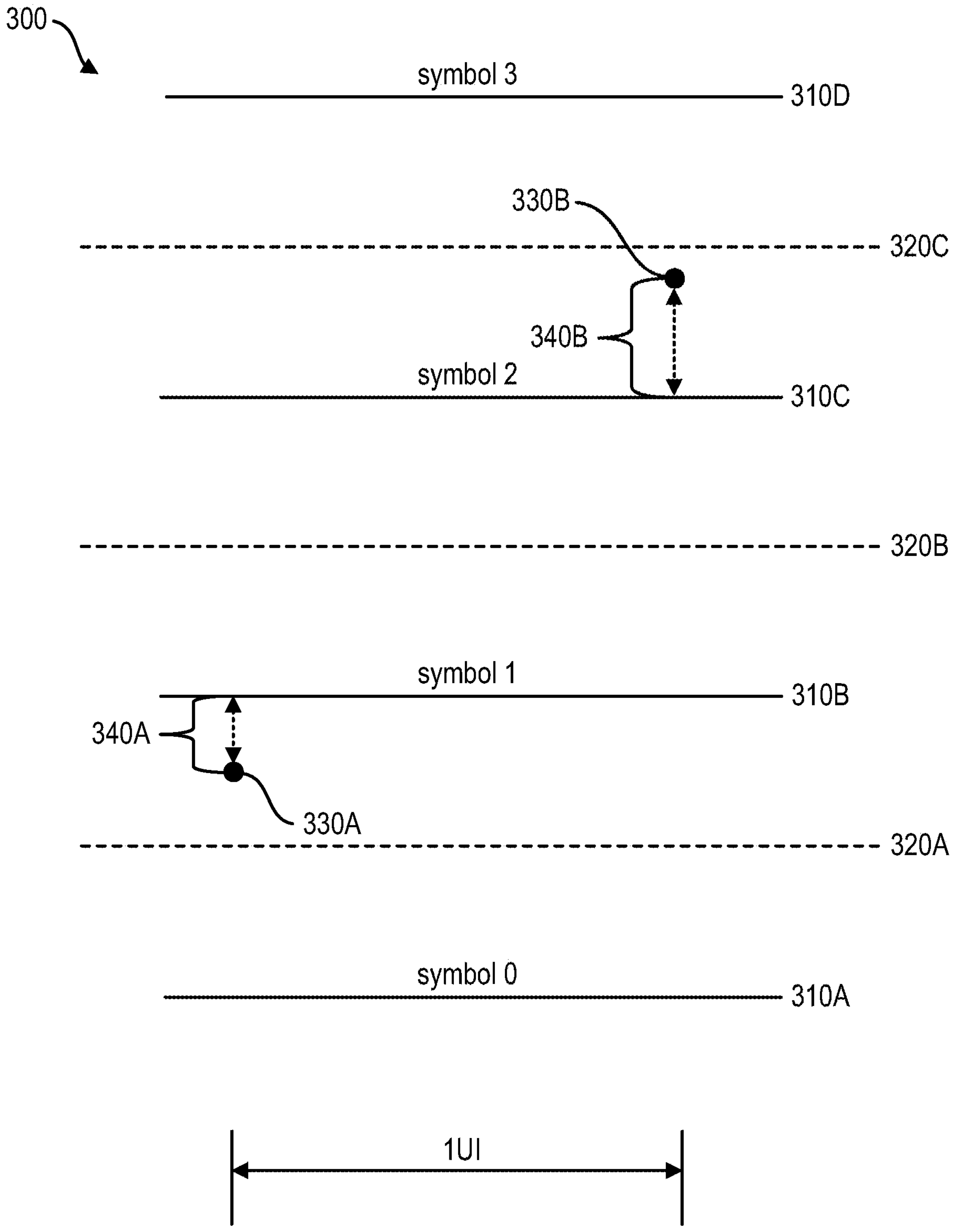
FIG. 3 shows a slicer error computation block of a PAM-4 PHY SerDes receiver according to one or more examples.

FIG. 3 shows a slicer error computation block 300 of a PAM-4 PHY SerDes receiver according to one or more examples. The slicer error computation block 300 may compute one or more slicer errors for the symbols of the sequence of symbols. As shown in FIG. 3, there are four expected PAM-4 levels 310A, 310B, 310C, and 310D, and three symbol threshold lines 320A, 320B, and 320C between the four expected PAM-4 levels 310A, 310B, 310C, and 310D. According to one or more examples, the second expected PAM-4 level 310B is above the first expected PAM-4 level 310A, the third expected PAM-4 level 310C is above the second expected PAM-4 level 310B, and the fourth expected PAM-4 level 310D is above the third expected PAM-4 level 310C. According to one or more examples, the first symbol threshold line 320A is equidistant between the first expected PAM-4 level 310A and the second expected PAM-4 level 310B, the second symbol threshold line 320B is equidistant between the second expected PAM-4 level 310B and the third expected PAM-4 level 310C, and the third symbol threshold line 320C is equidistant between the third expected PAM-4 level 310C and the fourth expected PAM-4 level 310D. According to one or more examples, the first expected PAM-4 level 310A may correspond to "00," the second expected PAM-4 level 310B may correspond to "01," the third expected PAM-4 level 310C may correspond to "10," and the fourth expected PAM-4 level 310D may correspond to "11."

The slicer error computation block 300 may receive a sequence of symbols of a recovered data stream after processing by the FFE/DFE block 200. The slicer error computation block 300 may measure a distance 340A between a first symbol 330A of the sequence of symbols and the nearest expected PAM-4 level (e.g., the second expected PAM-4 level 310B). As shown in FIG. 3, the first symbol 330A is has an amplitude value between first expected PAM-4 level 310A and the second expected PAM-4 level 310B. The first symbol 330A has an amplitude value above the first symbol threshold line 320A, meaning that the first symbol 330A is closest to the second expected PAM-4 level 310B. The slicer error of the first symbol 330A may be computed by measuring the distance 340A between the amplitude value of the first symbol 330A and the nearest expected PAM-4 level (e.g., the second expected PAM-4 level 310B). According to one or more examples, the slicer error of the first symbol 330A may be equal to an absolute value of the distance 340A, a square of the distance 340A, the absolute value of the distance 340A raised to a power, or any other similar metric.

At the next unit interval, the slicer error computation block 300 may receive a second symbol 330B of the sequence of symbols of the recovered data stream after processing by from the FFE/DFE block 200. As shown in FIG. 3, the second symbol 330B has an amplitude value between the third expected PAM-4 level 310C and the fourth expected PAM-4 level 310D. The second symbol 330B has an amplitude value below the third symbol threshold line 320C, meaning that the second symbol 330B is closest to the third expected PAM-4 level 310C. The slicer error of the second symbol 330B may be determined by computing a distance 340B between the amplitude value of the second symbol 330B and the nearest expected PAM-4 level (e.g., the third expected PAM-4 level 310C). According to one or more examples, the slicer error of the second symbol 330B may be equal to an absolute value of the distance 340B, a square of the distance 340B, a square of the absolute value of the distance 340B, or any other similar metric.

As shown in FIG. 3, the measured distance 340B for the second symbol 330B is greater than the distance 340A for the first symbol 330A. Therefore, the slicer error of the second symbol 330B, which is derived from the distance 340B, is greater than the slicer error of the first symbol 330A, which is derived from the distance 340A. According to one or more examples, a symbol with an amplitude value on one of the three threshold lines 320A, 320B, and 320C may have a largest slicer error. According to one or more examples, a symbol with an amplitude value on one of the four expected PAM-4 levels 310A, 310B, 310C, and 310D may have a lowest slicer error (e.g., slicer error=0).

Figure 4:
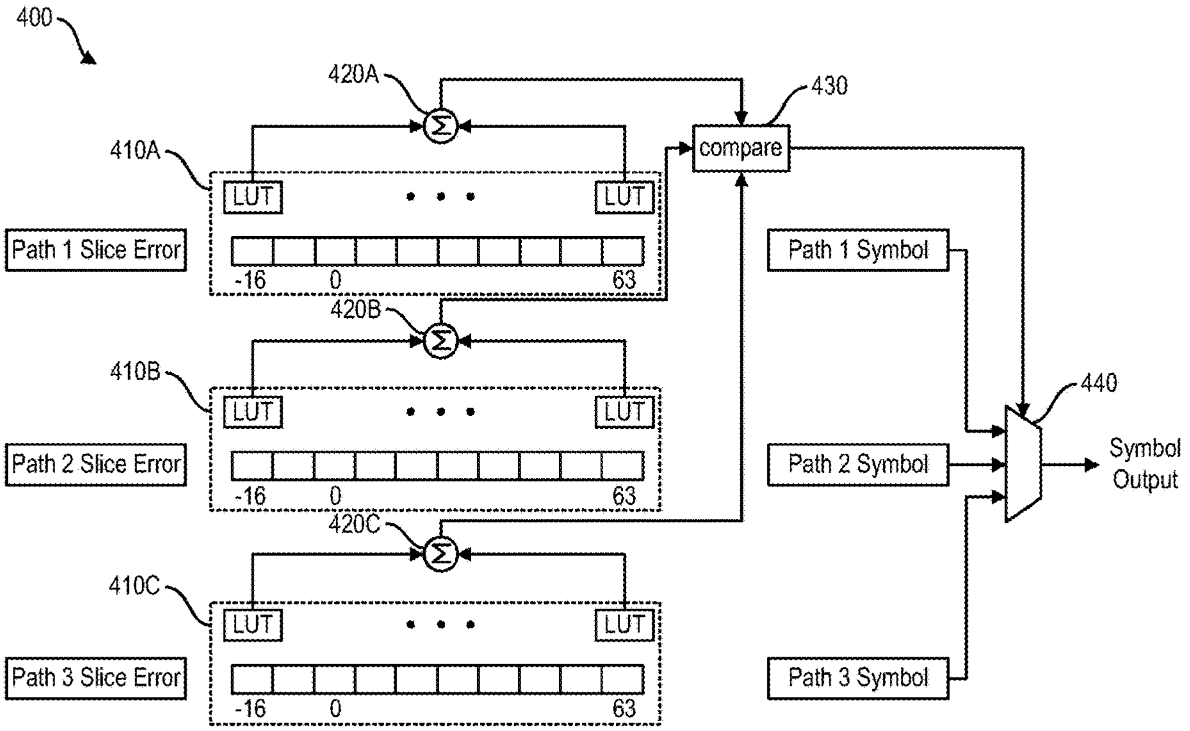
FIG. 4 shows a receiver path selection block of a PAM-4 PHY SerDes receiver according to one or more examples.

FIG. 4 shows a receiver path selection block 400 of a PAM-4 PHY SerDes receiver according to one or more examples. The receiver path selection block 400 may compute a total slicer error for each receiver path and select the receiver path with the lowest total slicer error. As shown in FIG. 4, the receiver path selection block 400 may include a plurality of lookup tables (LUTs) 410A, 410B, and 410C respectively corresponding to the different receiver paths (e.g., Path 1, Path 2, and Path 3), a plurality of adders 420A, 420B, and 420C, a comparator 430, and a multiplexer (MUX) 440. According to one or more examples, Paths 1, 2, and 3 respectively correspond to the leading, nominal, and lagging receiver paths described in FIG. 2.

According to one or more examples, each LUT may store a slicer error for a symbol at an index corresponding to a unit interval of the symbol. According to one or more examples, the LUT may perform the distance computation described in FIG. 3, and there may be one physical LUT element per distance computation. According to one or more examples, LUTs 410A, 410B, and 410C may have indices ranging from −16 to 63. Indices −16 to −1 may correspond to an overlap window with a size of 16 UI and indices 0 to 63 may correspond to a main analysis window with a size of 64 UI. For example, a symbol Path 1 slicer error at −16 UI may be stored in LUT 410A at index −16, a symbol Path 1 slicer error at −15 UI may be stored in LUT 410A at index −15, and so on, until a symbol Path 1 slicer error at 63 UI is stored in LUT 410A at index 63. According to one or more examples, a symbol Path 2 slicer error at −16 UI may be stored in LUT 410B at index −16, a symbol Path 2 slicer error at −15 UI may be stored in LUT 410B at index −15, and so on, until a symbol Path 2 slicer error at 63 UI is stored in LUT 410B at index 63. According to one or more examples, a symbol Path 3 slicer error at −16 UI may be stored in LUT 410C at index −16, a symbol Path 3 slicer error at −15 UI may be stored in LUT 410C at index −15, and so on, until a symbol Path 3 slicer error at 63 UI is stored in LUT 410C at index 63. According to one or more examples, the symbol slicer errors may have been computed by the slicer error computation block 300 in FIG. 3. According to one or more examples, the sampling rate of the different receiver paths may depend on a frequency of a clock cycle (e.g., 64 UI at 1 GHz or 32 UI at 2 GHz). According to one or more examples, the different receiver paths of the recovered data stream may be sampled over at least 64 UI.

The adders 420A, 420B, and 420C may sum slicer errors from the slicer error computation block 300 to obtain total slicer errors for the different receiver paths. For example, the adder 420A may retrieve Path 1 slicer errors stored in LUT 410A and sum the Path 1 slicer errors over 64+16 UI to obtain a total Path 1 slicer error. Similarly, the adder 420B may retrieve Path 2 slicer errors stored in LUT 410B and sum the Path 2 slicer error values over 64+16 UI to obtain a total Path 2 slicer error. Finally, the adder 420C may retrieve Path 3 slicer errors stored in LUT 410C and sum the Path 3 slicer error values over 64+16 UI to obtain a total Path 3 slicer error. The comparator 430 may determine a lowest total slicer error of the different receiver paths. The MUX 440 may identify the receiver path that corresponds to the lowest total slicer error, and output a PAM-4 symbol that corresponds to the identified receiver path.

Various examples have been disclosed herein, in connection with the above description and the drawings. It will be understood that it would be unduly repetitious to literally describe and illustrate every combination and subcombination of these examples. Accordingly, all examples can be combined in any way and/or combination, and the present specification, including the drawings, shall be construed to constitute a complete written description of all combinations and subcombinations of the examples described herein, and of the manner and process of making and using them, and shall support claims to any such combination or subcombination.

It will be appreciated by persons skilled in the art that the examples described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A pulse amplitude modulation 4-level (PAM-4) physical layer (PHY) serializer/deserializer (SerDes) receiver comprising:
- an analog-front-end (AFE) block to receive a transmit signal;
- an analog-to-digital converter (ADC) block to convert the transmit signal into a digital signal at sampling intervals defined by a sampling clock signal;
- a clock and data recovery (CDR) circuit to receive the digital signal from the ADC block and extract a recovered clock signal and a recovered data stream, the recovered data stream containing a sequence of symbols with amplitude values corresponding to four levels of PAM-4;
- a phase integrator (PI) to generate the sampling clock signal for the ADC block based on the recovered clock signal; and
- a feedforward phase correction (FFPC) block to receive the recovered data stream and generate a receive signal, the FFPC block comprising:
  - a feed-forward equalization/decision feedback equalization (FFE/DFE) block to equalize the recovered data stream across different receiver paths including a leading path, a nominal path, and a lagging path, wherein the nominal path is based on a clock of the receiver aligning with timing of the transmit signal, the leading path is based on the transmit signal arriving earlier than expected and processes the recovered data stream with an earlier phase shift, and the lagging path is based on the transmit signal arriving later than expected and processes the recovered data stream with a delayed phase shift;
  - a slicer error computation block to compute one or more slicer errors for the symbols of the sequence of symbols; and
  - a receiver path selection block to compute a total slicer error for each receiver path by aggregating slicer errors corresponding to the respective receiver path over a plurality of unit intervals, and select the receiver path with the lowest total slicer error.

2. The receiver of claim 1, wherein the FFE/DFE block comprises:
- a 37-tap FFE to receive the recovered data stream and perform feed-forward equalization on the recovered data stream;
- a plurality of 3-tap FFEs to receive the recovered data stream and perform feed-forward equalization, the plurality of 3-tap FFEs respectively corresponding to the different receiver paths;
- a plurality of adders to combine an output signal of the 37-tap FFE with a respective output signal of one of the plurality of 3-tap FFEs to generate combined equalized signals for the respective receiver paths;
- a plurality of one-tap DFEs respectively corresponding to the different receiver paths, the plurality of one-tap DFEs to receive the combined equalized signals from the plurality of adders and apply decision feedback equalization; and
- a multiplexer to receive output signals from the plurality of one-tap DFEs and select one of the outputs for delivery to the slicer error computation block.

3. The receiver of claim 1, wherein a slicer error for a symbol is computed by measuring a distance between the amplitude value of the symbol and a nearest expected PAM-4 level.

4. The receiver of claim 3, wherein the nearest expected PAM-4 level is determined based on whether the amplitude value of the symbol is above or below a symbol threshold line, the symbol threshold line being equidistant between two adjacent expected PAM-4 levels.

5. The receiver of claim 3, wherein the slicer error for the symbol is an absolute value of the distance, a square of the distance, or the absolute value of the distance raised to a power.

6. The receiver of claim 3, wherein the slicer error for the symbol is greatest when the amplitude value of the symbol is on a symbol threshold line, and lowest when the amplitude value of the symbol is on an expected PAM-4 level.

7. The receiver of claim 1, wherein the receiver path selection block comprises a lookup table to store the slicer error for a symbol at an index corresponding to a unit interval of the symbol.

8. The receiver of claim 7, wherein the recovered data stream is sampled over at least 64 unit intervals.

9. The receiver of claim 1, wherein a first symbol error rate (FSER) of the receiver is less than or equal to PCIe Gen7 specification standard 1e-6.

10. The receiver of claim 1, wherein the CDR is to implement a Mueller-Muller (MM) technique or Bang-Bang (BB) technique.

11. The receiver of claim 1, wherein the receiver path selection block comprises:

a plurality of adders to sum slicer errors from the slicer error computation block to determine total slicer errors for the different receiver paths;

a comparator to determine a lowest total slicer error of the different receiver paths; and a multiplexer to identify the receiver path that corresponds to the lowest total slicer error, and output a PAM-4 symbol that corresponds to the identified receiver path.

12. A feedforward phase correction (FFPC) block of a pulse amplitude modulation 4-level (PAM-4) physical layer (PHY) serializer/deserializer (SerDes) receiver for signal processing, the FFPC block comprising:

a feed-forward equalization/decision feedback equalization (FFE/DFE) block to equalize a recovered data stream containing a sequence of symbols across different receiver paths including a leading path, a nominal path, and a lagging path, wherein the nominal path is based on a clock of the receiver aligning with timing of a transmit signal, the leading path is based on the transmit signal arriving earlier than expected and processes the recovered data stream with an earlier phase shift, and the lagging path is based on the transmit signal arriving later than expected and processes the recovered data stream with a delayed phase shift;

a slicer error computation block to compute one or more slicer errors for the symbols of the recovered data stream; and a receiver path selection block to compute a total slicer error for each receiver path by aggregating slicer errors corresponding to the respective receiver path over a plurality of unit intervals, and select a receiver path with a lowest total slicer error.

13. The FFPC block of claim 12, wherein a slicer error for a symbol is computed by measuring a distance between an amplitude value of the symbol and a nearest expected PAM-4 level.

14. The FFPC block of claim 13, wherein the nearest expected PAM-4 level is determined based on whether the amplitude value of the symbol is above or below a symbol threshold line, the symbol threshold line being equidistant between two adjacent expected PAM-4 levels.

15. The FFPC block of claim 14, wherein the slicer error for the symbol is an absolute value of the distance, a square of the distance, or the square of the absolute value of the distance.

16. The FFPC block of claim 14, wherein the slicer error for the symbol is greatest when the amplitude value of the symbol is on a symbol threshold line, and lowest when the amplitude value of the symbol is on an expected PAM-4 level.

17. A method for signal processing in a feedforward phase correction (FFPC) block of a pulse amplitude modulation 4-level (PAM-4) physical layer (PHY) serializer/deserializer (SerDes) receiver, the method comprising:

equalizing a recovered data stream containing a sequence of symbols across different receiver paths, including a leading path, a nominal path, and a lagging path, using a feed-forward equalization/decision feedback equalization (FFE/DFE) process, wherein the nominal path is based on a clock of the receiver aligning with timing of a transmit signal, the leading path is based on the transmit signal arriving earlier than expected and processes the recovered data stream with an earlier phase shift, and the lagging path is based on the transmit signal arriving later than expected and processes the recovered data stream with a delayed phase shift;

computing one or more slicer errors for the symbols of the recovered data stream;

computing a total slicer error for each receiver path by aggregating slicer errors corresponding to the respective receiver path over a plurality of unit intervals; and selecting a receiver path with the lowest total slicer error.

18. The method of claim 17, wherein the FFE/DFE process comprises applying decision feedback equalization using one-tap DFEs respectively corresponding to the different receiver paths.

19. The method of claim 18, wherein a one-tap leading DFE has a coefficient greater than a threshold value and a one-tap lagging DFE has a coefficient less than the threshold value.

20. The method of claim 17, comprising storing slicer errors in a lookup table comprising indices corresponding to an overlap window and a main analysis window.

* * * * *